June 6, 1961  
J. W. APGAR  
2,986,921  
REVERSE ACTION DEVICE FOR SUBJECTING AN  
OBJECT TO A SINGLE IMPULSE  
Filed Jan. 13, 1960
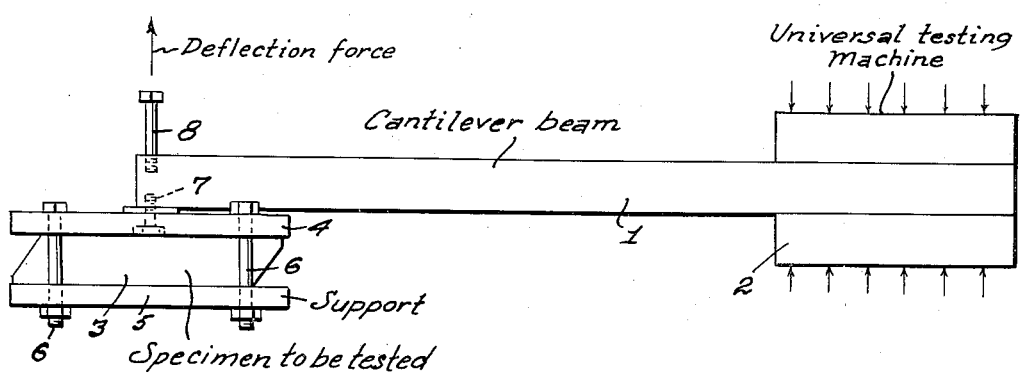
INVENTOR.  
James W. Apgar  
BY  
S. J. Rotondi & A. J. Dupont

United States Patent Office 2,986,921
Patented June 6, 1961

2,986,921
REVERSE ACTION DEVICE FOR SUBJECTING AN OBJECT TO A SINGLE IMPULSE
James William Apgar, Havre de Grace, Md., assignor to the United States of America as represented by the Secretary of the Army
Filed Jan. 13, 1960, Ser. No. 2,313
2 Claims. (Cl. 73—12)
(Granted under Title 35, U.S. Code (1952), sec. 266)

The invention described herein may be manufactured and used by or for the Government for governmental purposes without the payment to us of any royalty thereon.

This invention relates to a shock testing device which utilizes the first pulse of a vibration elastic system, for subjecting an object to a sudden impact, similar to that when the object falls from a great height. The invention more particularly relates to a testing device which requires a sudden release of a deflected elastic member, whereby in the subsequent swing, the object being tested is freed as a result of the change in direction of the force on the object, so that only a single impulse of predetermined magnitude acts upon the object.

The present invention has for its purpose to utilize the first pulse of a vibration elastic system which may be any structural member capable of vibration such as a cantilever, simple or fixed beam, or a spring. A specimen to be tested, such as a periscope for a tank, camera, meter or the like, is attached to the underside of the cantilever at the free end thereof, by a first bolt having a predetermined tensile strength. A second bolt, having a tensile strength greater than that of the first bolt, is secured to the upper side of the cantilever, opposite the article to be tested. The cantilever is pulled vertically upward until the second bolt is ruptured, releasing the cantilever to travel beyond its stationary point to a point nearly equal in the reverse direction to that of its initial deflection. This will impart enough shock to the first bolt to rupture it and release the specimen which then falls into a suitable container of soft material.

The accompanying drawing illustrates a preferred, simple embodiment of the invention.

On the drawing 1 indicates a cantilever which is secured at one end as at 2 in a standard universal testing machine (not shown). The specimen to be tested, such as a tank periscope or like object 3, is attached in a support, which as shown on the drawing, includes horizontal upper and lower plates 4 and 5 respectively, which are connected by bolts 6 which may be tightened against specimen 3 for securement. The support is attached to the underside of cantilever 1 by a threaded first bolt 7 having a predetermined tensile strength. A beam deflecting second bolt 8, of a predetermined tensile strength greater than that of the first bolt 7, is adapted to be lifted vertically by a hydraulic jack (not shown) or like moving medium.

In operation, the specimen 3 to be tested is secured in a horizontal position between plates 4 and 5 of the support. The support is then fastened to the underside of cantilever 1 by first bolt 7 which, under static conditions will support at least the weight of the test assembly, and is threaded into lever 1. A hydraulic jack or the like (not shown) is attached to second bolt 8 and the cantilever 1 is pulled upward until bolt 8 ruptures. Cantilever 1 will spring downward from the sudden release and the weaker bolt 7 will rupture due to the snap action of the test assembly on the said bolt, thus releasing the support with specimen 3, allowing it to fall into a container of soft material (not shown).

Thus, only a single impulse of predetermined magnitude acts on the specimen and provides a unique and simple shock testing device.

Variations and modifications may be effected without departing from the scope of the novel concept of the present invention.

What is claimed is:

1. A shock testing device comprising a beam having a free end and an oppositely secured end, a first bolt having a predetermined tensile strength, said first bolt being secured on the upper face of the beam at the free end thereof, a support for securing a test specimen therein, a second bolt extending through said support and threaded to the under face of said beam at the free end thereof, said first bolt having a predetermined greater tensile strength than said second bolt, means for applying a vertical lifting force to said first bolt until rupture thereof, said beam, upon said rupture, swinging downwardly and rebounding to rupture the second bolt and release the support carrying said specimen from the beam.

2. A shock testing device comprising a cantilever beam having a free end and a secured end, a supporting structure for securing an object to be tested in a horizontal position therein, a first bolt threadably securing said supporting structure to the underside of said beam at its free end, said first bolt having a tensile strength sufficient to support at least the weight of said supporting structure under static conditions, a second bolt threadably engaging the upper side of said beam at its free end, said second bolt having a predetermined tensile strength greater than that of said first bolt and means for applying a vertical lifting force to said second bolt until rupture thereof, whereby said beam is released to swing downward through its normal stationary position to a point equal in the reverse direction and when said beam snaps back at the end of its downward swing, said first bolt fractures by the impact causing separation of said supporting structure from said beam.

References Cited in the file of this patent
UNITED STATES PATENTS

| | | |
|---|---|---|
| 2,401,485 | Jarnagin | June 4, 1946 |
| 2,630,704 | Armstrong | Mar. 10, 1953 |